Aug. 11, 1925.
F. L. COX ET AL
1,549,454
SEPARABLE RIM FOR VEHICLE WHEELS
Filed Oct. 15, 1923
2 Sheets-Sheet 1
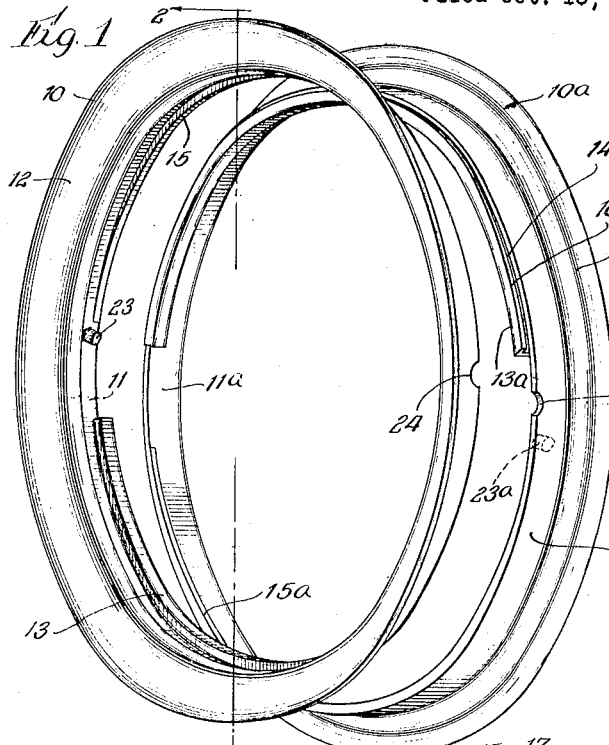
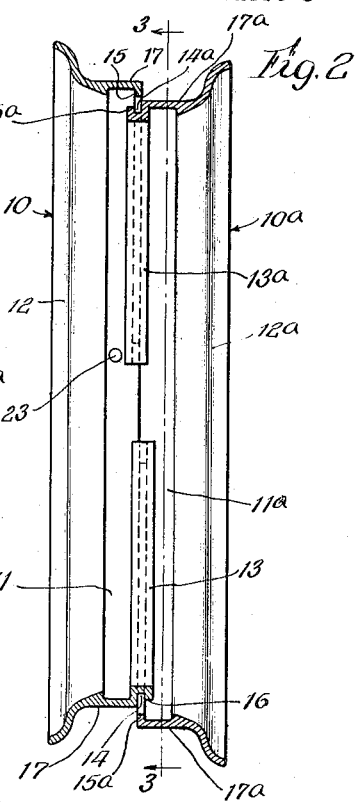
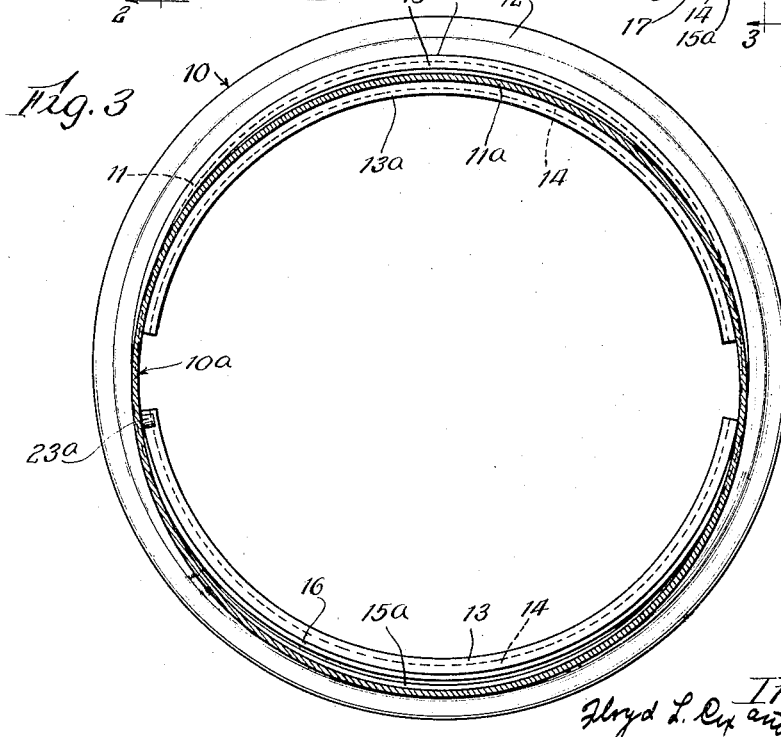

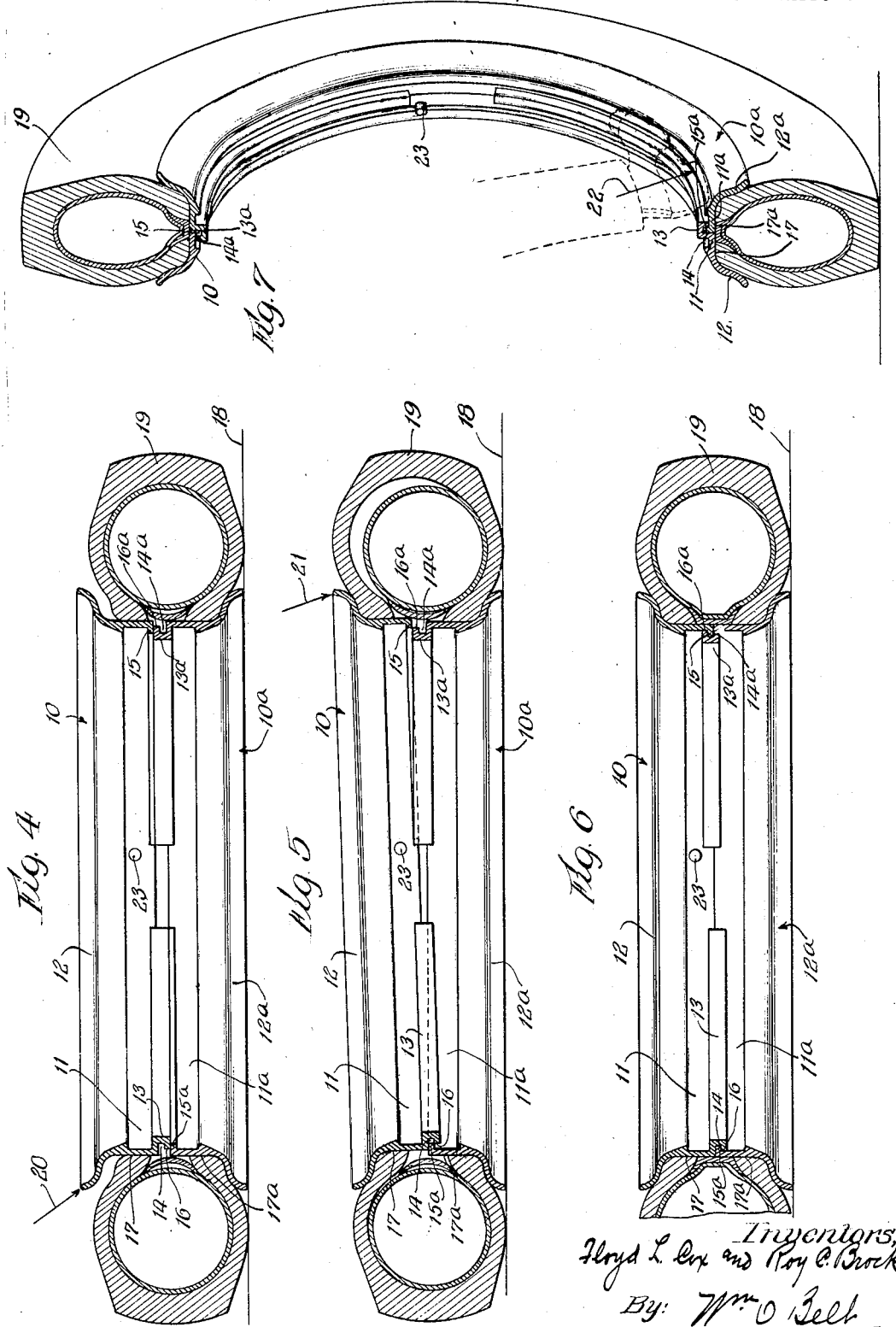

Patented Aug. 11, 1925.

1,549,454

UNITED STATES PATENT OFFICE.

FLOYD L. COX AND ROY C. BROCK, OF DAVENPORT, IOWA.

SEPARABLE RIM FOR VEHICLE WHEELS.

Application filed October 15, 1923. Serial No. 668,672.

*To all whom it may concern:*

Be it known that we, FLOYD L. Cox and Roy C. BROCK, citizens of the United States, residing at Davenport, in the county of Scott and State of Iowa, have invented certain new and useful Improvements in Separable Rims for Vehicle Wheels, of which the following is a specification.

This application is a continuation in part of our application for Letters Patent of the United States filed September 14, 1922, Serial No. 588,196, for improvements in separable rims for motor vehicle wheels.

The main object of this invention is to provide an improved separable rim to be used upon vehicle wheels and the like.

A further object of the invention is to provide a vehicle wheel rim for carrying a tire, the construction of the rim permitting the rim and tire to be assembled in a minimum of time and with but little effort as compared with the time and effort now required to assemble a tire with one of the rims now in use.

A still further object of the invention is to provide a vehicle wheel rim having separable members which are held against displacement relative to each other by the tire mounted upon the rim.

Other objects of the invention will become apparent as the detail description progresses, reference being had to the accompanying drawings, wherein—

Fig. 1 is a perspective view of our improved vehicle wheel rim, the rim comprising a plurality of complementary members shown in spaced relation to illustrate the construction thereof.

Fig. 2 is a section taken on line 2—2 of Fig. 1, the complementary members of the rim being shown in positions wherein movement of one of the members in the direction of a diameter thereof will cause it to interlock with the other member.

Fig. 3 is a section on line 3—3 of Fig. 2.

Figs. 4, 5 and 6 are central transverse sections through the rim and a tire being assembled therewith, and Fig. 7 is a fragmentary perspective of the rim and a tire assembled therewith, the purpose of this figure being to illustrate a preferred method of separating the members of the rim to permit removal of the tire.

Referring for the present to Fig. 1, each of the reference characters 10 and 10ª designates one of a pair of complementary members forming parts of our improved rim for vehicle wheels. As shown in Fig. 1, the complementary members 10 and 10ª are preferably identical in form, and, as clearly apparent from the following description, each of the members may be interchanged with either of the members of a rim of similar construction. The advantage of this construction is apparent but it will be readily understood that our invention is not limited to a vehicle wheel rim comprising complementary members adapted to be indiscriminately interchanged with the complementary members of another rim of like construction. The essence of the invention lies in the construction of the rim, which construction enables the operator to assemble the complementary members in place in a tire quickly and easily, and which construction permits the tire to hold the complementary members in place, thus obviating the necessity of providing separate means for performing this function assigned to the tire.

The complementary members 10 and 10ª preferably comprise circular sections 11 and 11ª respectively which are provided with flaring annular flanges 12 and 12ª respectively, the flaring flanges 12 and 12ª being adapted to prevent lateral displacement of a tire (Fig. 6) carried by the rim. It will be noted that the flaring annular flanges 12 and 12ª are formed integral with the circular sections 11 and 11ª respectively at the outer edges thereof. Projecting laterally from the inner edges of the circular sections 11 and 11ª are arcuate flanges 13 and 13ª respectively. The arcuate flange 13 is disposed concentrically with respect to the axis of the circular section 11 and it extends through an arc of less than 180°. In a like manner, the arcuate flange 13ª is disposed concentrically with respect to the axis of the circular section 11ª and it also extends through an arc of less than 180°. The arcuate flanges 13 and 13ª are provided with grooves 14 and 14ª respectively (Fig. 2) which are adapted to be engaged by certain lugs or ribs preferably formed integral with the circular sections 11 and 11ª, the groove 14 being adapted to be engaged by the rib 15ª formed integral with the circular section 11ª and the groove 14ª being adapted to be engaged by the rib 15 formed integral with the circular section 11. Each of the ribs 15 and 15ª is arranged to lie in the plane substantially normal to the axis of its respective circular section and each of the ribs may be said to form an arc of less than 180°. As clearly shown in Figs. 1 and 3, each of the ribs 15 and 15ª tapers from a maximum height at a point intermediate its ends to a minimum height at its ends. To recapitulate, each of the complementary members preferably comprises a circular section, a flaring annular flange formed integral with the circular section, a grooved arcuate flange formed integral with and projecting laterally of the circular section, and a tapered rib disposed in a plane substantially normal to the axis of the circular section, the rib being disposed diametrically with respect to the arcuate flange. And it is well to point out at this point in the description that the outermost cylindrical surfaces 16 and 16ª of the arcuate flanges 13 and 13ª respectively may be defined as cylindrical surfaces lying below the tire-supporting surfaces 17 and 17ª of the circular section 11 and 11ª respectively.

Referring now to Figs. 2 and 3, it will be noted that the complementary members may be placed in positions wherein portions of the inner edge of the member 10 will contact portions of the inner edge of the member 10ª, and wherein the groove 14ª will be directly beneath the rib 15, the rib 15ª being disposed directly beneath the groove 14. When the complementary members are so disposed relatively to each other, the arcuate flange 13ª projects into the circular section 11, and the arcuate flange 13 projects into the circular section 11ª. An inspection of Figs. 2 and 3 will make apparent the fact that there will be no interference between the arcuate flanges and the ribs because each rib and flange extends through an arc of less than 180°. It will also be apparent that the arcuate flanges will not bind upon the inner cylindrical surfaces of the circular sections as the outermost cylindrical surfaces 16 and 16ª of the arcuate flanges have been lowered beneath their respective tire supporting surfaces a distance sufficient to prevent such binding action, and in addition the ribs have been tapered to insure sufficient clearance.

After the complementary members have been disposed in the relative positions shown in Figs. 2 and 3, the complementary member 10ª may be moved upwardly until its groove 14ª is engaged by the rib 15 of the complementary member 10. This movement of the complementary member 10ª will also cause its rib 15ª to enter the groove 14 of the complementary member 10. In other words, the complementary member 10ª may be moved in the direction of a diameter thereof to bring it into a position wherein it interlocks with the complementary member 10. The complementary member 10ª simply slides into position and no accompanying angular displacement thereof relative to the complementary member 10 is necessary. Fig. 6 shows the complementary members in interlocked positions.

We will now describe the manner in which we prefer to assemble the complementary members with a tire.

When the complementary members are to be assembled with a tire, either one of the complementary members is first placed upon a suitable support which is indicated by the line 18 in Figs. 4, 5, and 6. In these figures, we have shown the complementary member 10ª resting upon the support 18. Referring now to Fig. 4, it will be noted that the complementary member 10ª has been placed upon the support 18 in a position which permits a partially inflated tire 19 to be properly placed upon the member, the tire being shown in its correct position. The complementary member 10 has been inserted in the tire and rests upon the complementary member 10ª, the arcuate flange 13 resting upon the rib 15ª and the rib 15 resting upon the arcuate flange 13ª. The resilient tire serves to hold the complementary members in positions wherein their axes are substantially coincident. Now if a force is applied in the direction and at the point indicated by the arrow 20 (Fig. 4), the complementary member 10 will slide first to the right (Fig. 4) and then downwardly until the groove 14 is engaged by the rib 15ª of the complementary member 10ª. The complementary members 10 and 10ª will then occupy the relative positions shown in Fig. 5; the tire 19 will be deformed and will seek to drive the complementary member 10 to the left (Fig. 5) which action would, of course, cause the rib 15ª to enter the groove 14. However, in actual practice it has been found that the tire 19 can only exert sufficient force to hold the complementary members in the relative positions shown in Fig. 5. With the complementary members held in the relative positions shown in Fig. 5, it is only necessary to apply a force in the direction and at the point indicated by the arrow 21 (Fig. 5) to cause the complementary member 10 to snap into the relative position shown in Fig. 6. While the applied force tends to drive the complementary member 10 to the right (Figs. 5 and 6), it will be readily understood that as soon as the complementary member 10 has been forced into a position wherein its rib 15 is aligned with the groove 14ª, a cessation of the force applied in the direction of the arrow 21 is accompanied by a restoration of the tire to its normal form and the complementary member 10 is shifted into a position wherein it interlocks with the complementary member 10ª. The manner in which force is applied in the directions and at the points indicated by the arrows 20 and 21 is, as follows:

The operator first pushes with his foot against the point indicated by the arrow 20 until the complementary members assume the relative positions shown in Fig. 5. Then the operator steps over onto that point which is designated by the arrow 21 and the member 10 snaps into a position which permits the tire to complete the assembling operation the instant the operator steps off the rim. Therefore, the entire operation of assembling the complementary members with the tire consists of arranging the several parts as shown in Fig. 4, stepping upon the point indicated by the arrow 20 and then stepping over to the point indicated by the arrow 21.

The assembled rim and tire may be considered a unit as this assembly may be carried as a spare tire; the tire 19 will prevent displacement of the complementary members relative to each other. The latter statement is especially true when the tire is in a fully inflated condition.

Fig. 7 illustrates the manner in which the complementary members are removed from the tire. The operator holds the tire in a substantially upright position and pushes with his foot against the complementary member 10ᵃ at a point adjacent the rim 15ᵃ, thus forcing that portion to be displaced in the direction indicated by the arrow 22. As the tire will have been partially or wholly deflated before an attempt is made to remove the rim therefrom, displacement of the member 10ᵃ in the direction indicated by the arrow 22 will permit the complementary members to assume the relative positions shown in Fig. 5 after which it is but a simple matter to remove the complementary members from the tire.

To prevent circumferential creeping of the members 10 and 10ᵃ relative to the felly of the wheel upon which the rim may be mounted, we have provided pins 23 and 23ᵃ upon the complementary members 10 and 10ᵃ respectively. The pins project inwardly from the inner cylindrical surfaces of the complementary members and are adapted to engage transverse grooves or the like in the felly of the wheel associated with the rim. It is apparent that the pins will prevent angular displacement of the complementary members relative to the felly.

The reference characters 24 and 24ᵃ designate registering notches in the inner edges of the complementary members (Fig. 1). These notches form an aperture in the assembled rim adapted to receive the usual air valve carried by the tire 19.

We are aware that changes in the form, construction and arrangement of parts may be made without departing from the spirit and without sacrificing the advantages of the invention and we reserve the right to make all such changes as fairly fall within the scope of the following claims.

We claim:

1. A wheel rim comprising a circular member having a groove extending through a portion of its circumference and having a rib diametrically opposite to said groove and extending through a portion of the circumference of said member.

2. A wheel rim comprising a circular member having a tire engaging surface, a circular flange lying below the tire engaging surface and provided with a groove, and a rib diametrically opposed to said flange.

3. A wheel rim comprising a circular member having a tire engaging surface, a groove below said surface and extending through a portion of the circumference of said member less than 180°, and a rib lying below said surface and diametrically opposed to said groove, said rib also extending through a portion of the circumference of said member less than 180°.

4. A wheel rim comprising a circular member having a tire engaging surface, a circular flange lying below the tire engaging surface and provided with a groove, and a rib diametrically opposed to said flange, said rib being tapered from a maximum height at a point intermediate its ends to a minimum height at its ends.

5. A wheel rim comprising two members, each member formed with a tire supporting surface, one of said members having a groove below said surface and substantially normal thereto, and the other of said members having a rib substantially normal to said surface and below the same and engaging the groove in the other of said members, where it is held against lateral displacement by contact with the walls of said groove.

6. A wheel rim comprising two members, each member formed with a tire supporting surface, one of said members having a groove below said surface and substantially normal thereto, and the other of said members having a rib substantially normal to said surface and below the same and engaging the groove in the other of said members where it is held against lateral displacement by contact with the walls of said groove, and means for preventing axial rotation of said members with respect to each other.

7. A wheel rim comprising two members, one member having a tire supporting surface, a groove lying below said surface through a portion of the circumference thereof, a rib lying below said surface through another portion of the circumference thereof, said second member having a tire supporting surface, a rib extending below said surface and received within the groove on said first named member and also having a groove beneath another portion of said surface receiving the rib on said first named member.

8. A wheel rim comprising two members, one member having a tire supporting surface, a groove lying below said surface through a portion of the circumference thereof, a rib lying below said surface through another portion of the circumference thereof, said second member having a tire supporting surface, a rib extending below said surface and received within the groove on said first named member and also having a groove beneath another portion of said surface receiving the rib on said first named member, and means to prevent axial rotation of one member relative to the other.

FLOYD L. COX.
ROY C. BROCK.